US010373180B2

(12) United States Patent
Garrett

(10) Patent No.: US 10,373,180 B2
(45) Date of Patent: Aug. 6, 2019

(54) CREATING A SURVEY SAMPLE GROUP ACCORDING TO A DESIRED PARTICIPANT DISTRIBUTION IN REAL TIME

(71) Applicant: ACE METRIX, INC., Mountain View, CA (US)

(72) Inventor: Douglas C. Garrett, Santa Monica, CA (US)

(73) Assignee: ACE METRIX, INC., Mountain View, CA (US)

( * ) Notice: Subject to any disclaimer, the term of this patent is extended or adjusted under 35 U.S.C. 154(b) by 864 days.

(21) Appl. No.: 14/301,144

(22) Filed: Jun. 10, 2014

(65) Prior Publication Data

US 2015/0006251 A1  Jan. 1, 2015

Related U.S. Application Data

(60) Provisional application No. 61/833,494, filed on Jun. 11, 2013.

(51) Int. Cl.
*G06Q 30/02* (2012.01)
(52) U.S. Cl.
CPC ................ *G06Q 30/0203* (2013.01)
(58) Field of Classification Search
CPC .................................. G06Q 30/0203
See application file for complete search history.

(56) References Cited

U.S. PATENT DOCUMENTS

| 6,430,539 | B1 * | 8/2002 | Lazarus | G06Q 30/02 705/14.1 |
| 8,024,213 | B1 * | 9/2011 | Fano | G06Q 30/0201 705/1.1 |
| 2002/0188777 | A1 * | 12/2002 | Kraft | G06Q 10/10 710/100 |
| 2006/0004621 | A1 * | 1/2006 | Malek | G06Q 30/02 705/7.32 |
| 2009/0018893 | A1 * | 1/2009 | Aviv | G06O 30/02 705/7.32 |
| 2009/0106084 | A1 * | 4/2009 | Or | G06O 30/02 705/7.33 |
| 2012/0116845 | A1 * | 5/2012 | Warta | G06O 30/0203 705/7.32 |
| 2012/0278132 | A1 * | 11/2012 | Weigh | G06Q 30/0261 705/7.34 |

(Continued)

*Primary Examiner* — Deirdre D Hatcher
(74) *Attorney, Agent, or Firm* — Kwan & Olynick LLP

(57) ABSTRACT

A balanced survey is automatically created in real time, that is, while potential survey participants are evaluated. A survey histogram is automatically re-balanced with each new entry accepted as a respondent. An individual fills out a questionnaire providing demographic and socio-economic data. A vector representation of that person, referred to as an entry, is created. A similarity value is calculated indicating the similarity between the vector representation and a histogram vector representing the make-up of the survey. The similarity value is calculated by taking a dot product of the entry vector representation and the histogram vector. The system then determines whether the similarity value is greater than a similarity threshold value. If the similarity value exceeds the threshold value, the entry vector is integrated into the histogram vector, that is, the individual becomes part of the survey group.

19 Claims, 4 Drawing Sheets

(56) References Cited

U.S. PATENT DOCUMENTS

Figure 1:
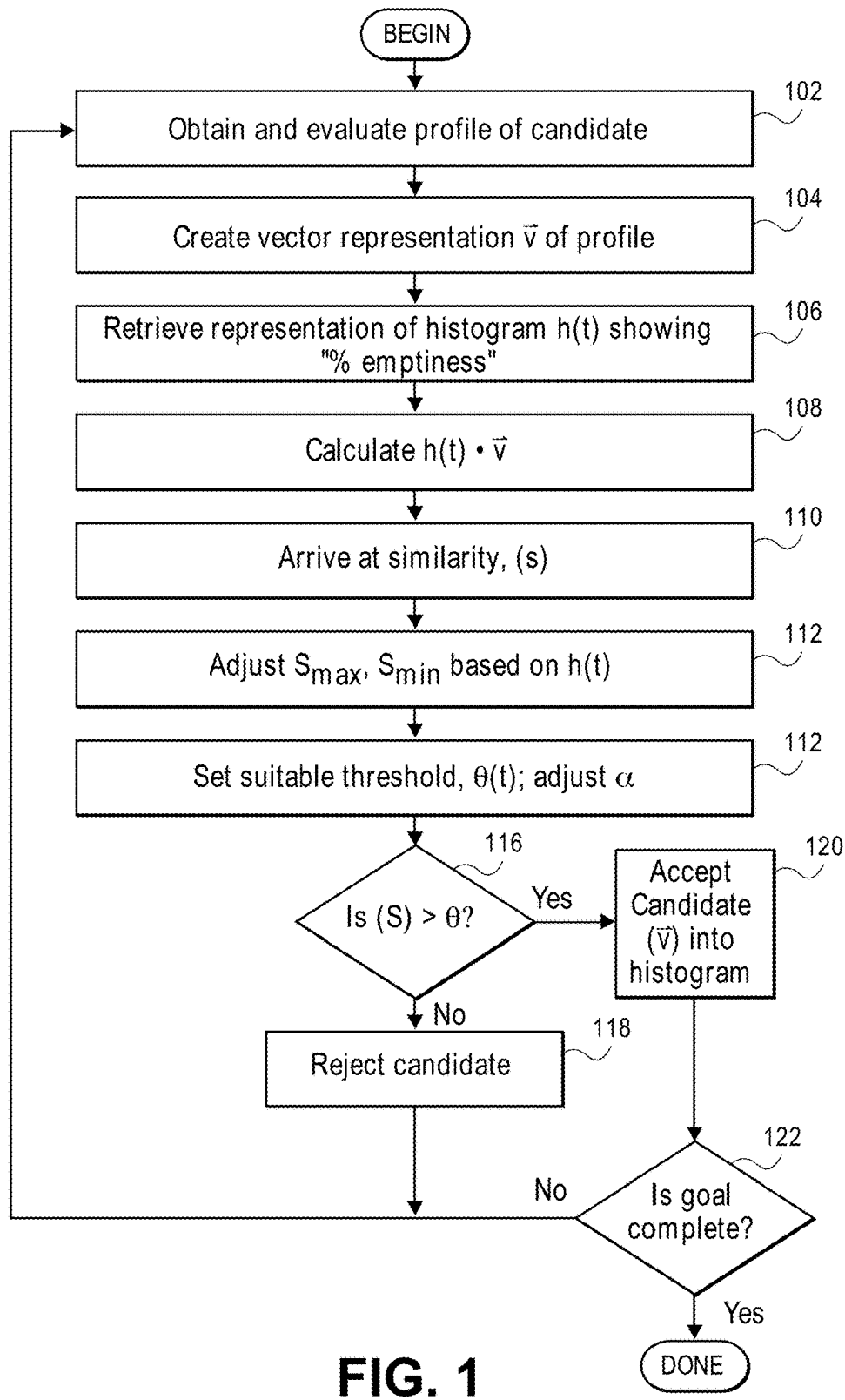

| | | | |
|---|---|---|---|
| 2013/0132328 A1* | 5/2013 | Alush | G06O 30/0203 706/52 |
| 2013/0226664 A1* | 8/2013 | Rinzler | G06Q 30/0203 705/7.32 |
| 2014/0200960 A1* | 7/2014 | Ducheneaut | G06Q 30/0204 705/7.33 |
| 2014/0358636 A1* | 12/2014 | Nowak | G06Q 30/0203 705/7.32 |

* cited by examiner

CREATING A SURVEY SAMPLE GROUP ACCORDING TO A DESIRED PARTICIPANT DISTRIBUTION IN REAL TIME

CROSS-REFERENCE TO RELATED APPLICATIONS

This application claims priority under U.S.C. § 119(e) to U.S. Provisional Application No. 61/833,494 filed Jun. 11, 2013, entitled SURVEY SAMPLE MANAGEMENT PROCESS AND SYSTEM, hereby incorporated by reference in its entirety.

BACKGROUND OF THE INVENTION

1. Field of the Invention

The present invention relates to statistics and survey group creation and sampling. More specifically, it relates to creating a survey group meeting specific requirements and evaluating a candidate's eligibility to participate in a survey group in real time using statistics and probabilities.

2. Description of the Related Art

Creating a group of survey participants can often be a challenge. Many people may be considered for the group but only certain ones who fit a specific profile are selected (referred to as respondents) to be in the survey. The profile of the group of respondents often must meet certain requirements in terms of demographics and socio-economic characteristics. For example, a company may want to measure the effectiveness of one of its ads. To do this it has respondents watch the ad and then evaluates reactions and opinions of the ad. It is important that the respondents be diversified so that the reactions to the ad do not all come predominantly from one or two demographic and socio-economic classes. For example, if only women, ages 18-26 with moderate household income are represented in the survey group, the evaluation would not be very meaningful. It would be more useful if the group was more diversified, had generally the same number of men and women, had respondents with low, moderate and high household incomes, came from different parts of the country, and so on.

However, creating a survey group with the desired diversity may be challenging and often requires significant manual oversight, in other words, human beings watching the process to ensure that the right distribution is forming. It may be difficult to find respondents that meet a certain profile (e.g., males, 40-50, high household income). If a survey is to have at least 500 respondents, it may be necessary to look at 600 or 700 individuals to identify the right respondents with the right demographic and socio-economic profile. Each person evaluated but not accepted into the survey group is referred to as an overage or the group of rejected individuals collectively is referred to as the overage in creating the group. Overages make the process of creating a survey group expensive, inefficient, and time-consuming. It would be desirable to have a system for creating a survey group of a certain profile while reducing overages. That is, a system that is able to determine what types of respondents (i.e., what gender, income level, marital status, etc.) are needed to create the desired survey group while the survey group is being created, that is, in real time. Additionally, there is often a need to create survey groups quickly and tailor them to be as close as possible to a pre-defined distribution. It would be desirable to have a system to tailor or create a survey group as it is being formed.

SUMMARY OF THE INVENTION

In one aspect of the present invention, a method of creating a balanced survey group in real time is described. An individual fills out a questionnaire or profile providing demographic and socio-economic data about himself. A vector representation of that person, referred to as an entry, is created. In one embodiment, with respect to two of the three goals described, the vector is eight dimensional (has eight element, such as two for gender, three for age, and three for income). In another embodiment, a vector is three dimensional where the eight categories are represented in three elements. A similarity value is calculated indicating the similarity between the vector representation and a histogram vector representing the make-up of the survey. The similarity value is calculated by taking a dot product of the entry vector representation and the histogram vector. The system then determines whether the similarity value is greater than a similarity threshold value. If the similarity value exceeds the threshold value, the entry vector is integrated into the histogram vector, that is, the individual becomes part of the survey group. The histogram representing the survey group is automatically updated in real time while the survey group is being created. The similarity threshold value is determined using a most-preferred entry vector and a least-preferred entry vector representing the type of respondent most needed and least needed in the survey, respectively.

BRIEF DESCRIPTION OF THE DRAWINGS

References are made to the accompanying drawings, which form a pact of the description and in which are shown, by way of illustration, specific embodiments of the present invention:

FIG. 1 is a flow diagram of a process for representing a new entry and determining whether to include the entry in the survey in accordance with one embodiment;

FIG. 2 is an example of histogram with respect to one of the goals in accordance with one embodiment;

FIGS. 3-5 are examples of histograms specifically showing bins for each goal in accordance with one embodiment; and FIGS. 6A and 6B are block diagrams of a computing system suitable for implementing various embodiments of the present invention.

DETAILED DESCRIPTION THE INVENTION

Example embodiments of an application security process and system are described. These examples and embodiments are provided solely to add context and aid in the understanding of the invention. Thus, it will be apparent to one skilled in the art that the present invention may be practiced without some or all of the specific details described herein. In other instances, well-known concepts have not been described in detail in order to avoid unnecessarily obscuring the present invention. Other applications and examples are possible, such that the following examples, illustrations, and contexts should not be taken as definitive or limiting either in scope or setting. Although these embodiments are described in sufficient detail to enable one skilled in the art to practice the invention, these examples, illustrations, and contexts are not limiting, and other embodiments may be used and changes may be made without departing from the spirit and scope of the invention.

Certain industries and businesses require taking a high number of surveys. This may involve not only studying results of surveys but ensuring that there is the right distribution of survey participants. For example, a company in the business of measuring and improving the effectiveness of advertising often needs sample groups to measure impressions of an ad. In some cases, companies in this field may need several new surveys a week or each day. Often, survey participants, also referred to as respondents, need to fit or come close to a certain demographic and socio-economic profile, depending on the type of survey being taken, the advertiser, and other parameters.

For example, consider a survey requiring a group of at least 500 or more respondents. This requirement is considered a hard goal in that there must be 500 or more respondents. The detailed composition of the 500 are mediated by what are referred to as soft goals in that there is some flexibility on the relative number of people in the different demographic and socio-economic categories. That is, of those 500, there usually needs to be nearly the same number of males and females, but not exactly the same number. For each of these two groups, it may be desirable that over half fall in the age range of 18-26 and none be over the age of 45. These are examples of soft goals. For example, everyone in the group should have an annual household income between $36,000 and $50,000 a year, and other socio-economic categories can be provided. In short, when forming survey groups from a large pool of candidates across many demographic and socioeconomic categories, companies often want to get as close as possible to a specific distribution of people over these categories, such as sex, age, annual income, place of residence, race, marital status, etc. These requirements exist for a specific reason or goal as determined by the service provider or other entity. For example, the most basic of which is given above in the form of a desire to have a gender ratio near unity. This, in general, will not happen automatically but can vary widely and must be managed in order to avoid the gender bias in the survey results that may otherwise occur.

As noted, generally it is desirable to prevent what are referred to as overages when creating a group of survey takers. To explain the concept of overages and the associated costs, it is helpful to look first at a simple example. Suppose a group of 500 survey takers is needed and approximately half need to be male and the other half female. An entity, such as an advertising company (herein referred to as "company"), creating this group may enlist the help of a third-party (herein "service provider") that finds potential survey takers (from the general population) and sends their data to the company. The company may accept or decline them. The company pays the service provider for each survey taker that the company accepts. Ideally, the service provider sends over exactly 250 female survey participants and 250 male survey participants. The company needed 500 survey takers and got exactly the right number of males and females, and paid the service provider for exactly 500 participants. There are no overages in this case. However, this rarely happens. Of course, the demographic categories are often more complex (i.e., not a simple split down the middle based on gender). What often happens is that many of the survey takers sent by the service provider end up filling up one or more demographic buckets quickly (ones that the service provider can easily find) while other demographic categories do not fill up at the same rate and become steadily more in demand or needed as the survey group grows.

In another example, a company may want a survey group of 300 survey takers, a hard goal, where about 200 of them should be female, ages 30-45, no household income requirements and 100 must be male, ages 25-40, having a household income of at least $75,000 per year, all soft goals. Third parties may easily find survey takers in the female, 30-45, no income requirement bin and get paid by the company for each one that is accepted. While building the group, if the number of such survey takers reaches 200 and the number of males in the categories noted (25-40, $75 k/year, etc.) is only 25 or 30, then the company will start rejecting survey takers sent to it that are female (and the number of overages will grow). It does not need survey takers in that category any more. It will now only accept survey takers that are male and fit the other requirements.

At this stage, the third parties which are working to find potential survey takers start to notice a high rejection rate. They are not getting compensated for all these rejections. At some point they will start charging more for each survey taker that is accepted by the company (to make up for effort that went into all the rejections). In this example, this may be a survey bin that is male, 25-40, and making more than $75 k/year. Each survey taker that falls in this bin (and accepted by the company) will get more expensive. Third-parties may have sent 400 potential survey takers of which the company only accepted, say, 320. This is an overage of 80. There was inefficiency and wasted effort. Third parties were working to find potential survey takers to send to the company, but at a certain point many of them were being rejected and, consequently, the third parties were losing money. The company spent time looking at potential survey takers to build its survey group, but ended up having to reject many of them because they did not fit into the right bins and they already had enough of certain categories and so they were rejected. As noted, at some point the third parties will start charging more for each "accept" and the company will end up spending more to get the survey group of 400, a hard goal, with specific categories that it needs (soft goals). The company may settle for 275 females, 30-45, and no income requirement and only 25 males, 25-40, at the noted annual income, since these were soft goals, but this is not the desirable distribution and may have a negative impact on the company's primary business, for example, getting a true measure of the effectiveness of a particular ad, TV show, product, etc.

The company wants to avoid any type of undesired demographic or socioeconomic bias in its analysis. Having a survey group with the demographics described would not fulfill the company's needs. If overages were something that happened only occasionally, then it may not be a significant cost factor for the company. However, if each day the company had to create one or two hundred (or thousand) survey groups having various demographic and socioeconomic categories and the problem of overages was occurring in many of them, the impact on the company's operations would be significant. This would then be a serious inefficiency in terms of manpower and costs. In some cases the survey process may not even be completed, causing even more inefficiency for the company. There is incentive by the company to bring down the number of overages. This incentive may be a stronger incentive than that of the service provider given that they try to compensate for the loss in each rejection by charging more for each acceptance after a certain 'tipping point'.

A process to reduce overages should be implemented in real time, as potential survey takers are being selected, they should be evaluated on the spot. The primary issue is that the company does not know, a priori, who will be sent as survey takers; it does not know how the bins will be filled as the survey group is being created. The process of survey sample distribution balancing becomes difficult if the potential survey takers are accepted or rejected, one at a time, without knowing in advance who the next potential survey taker will be (e.g., male or female? his or her age? income? etc.).

In other words, a particular person that falls into a particular demographic/category slot is counted (accepted) or not (rejected) based only on the data from those who have already been counted towards the survey group (those whom have already taken the survey). In the example above, the company may not know in advance that it will have difficulty finding a male, 25-40 with the desired income and that the number of female survey takers will fill up much faster. In other embodiments, the company or service provider may use historical data to anticipate the difficulty in finding a certain type of a survey participant. As noted above, ideally the company wants to fill bins, represented by histograms, with exactly the number of survey participants needed. The company has to have a minimum number of survey takers hard goal) and may have to accept survey takers that may not satisfy its soft goals. The company is left to consider mitigating between two opposing goals, such as equal gender ratio (a soft goal) and total number of survey takers (a hard goal).

Methods and systems for automatically re-balancing a survey histogram to create a survey group meeting or resembling a specific demographic and socioeconomic profile are described in the various figures. The methods described enable balancing multiple categories (also referred to as bins) simultaneously and in real time as the survey group, comprised of respondents, is being created. In one embodiment, there is a specific goal, referred to as $G_0$, specifically that the survey has a minimum number of respondents that is satisfied. A process for this embodiment is shown in FIG. 1, which shows a way of representing a new entry (or candidate) and performing a comparison of that candidate against specific profiles, namely a profile of the least needed and the most needed respondent at a given time. Note that time is a critical factor and that with each iteration of the process shown in FIG. 1, time advances one unit and the variables and parameters change, even if the change is slight, which effects the next iteration. In other embodiments, additional goals, $G_1$ and $G_2$, are also satisfied. These goals are described below.

FIG. 1 is a flow diagram of a process for representing a new entry and determining whether to include the entry in the survey in accordance with one embodiment. At step 102 the service provider (the entity creating the survey) obtains a profile of a candidate through any suitable means, often a form completed by the individual either via online or hardcopy. The profile contains demographic and socioeconomic data on the individual, such as age, gender, and household income and may also ask about residency, race, ethnicity, and other data. The amount of data can vary but typically the minimum data includes gender, age, and household income. In one embodiment, the candidate provides an age group, male or female, and an income group. For illustrative purposes and for ease of explanation, age may be broken into three categories such as younger (18-26), middle (27-45), older (46 or older), or something similar and household income may be categorized as low, medium, and high. Of course, granularity and number of categories can vary widely but the principles described herein would still apply.

At step 104, a general-purpose computer (see FIGS. 6A and 6B) executing software embodying the present invention creates a vector v having elements for the new entry. Each element in the vector indicates whether the candidate is a member of a specific category or bin. In the described embodiment, there are eight bins: male, female, younger, middle, older, low, medium, and high. A new entry who is female, older, and has a medium household income would have the following vector: [0, 1, 0, 0, 1, 0, 0, 1]. Examples of this are described embodiment. A compressed or 3-dimensional version of a new entry vector is described below with respect to goal 2. Again, this is only an example to illustrate concepts of the present invention. The vector v can have other elements to represent additional bins.

Figure 2:
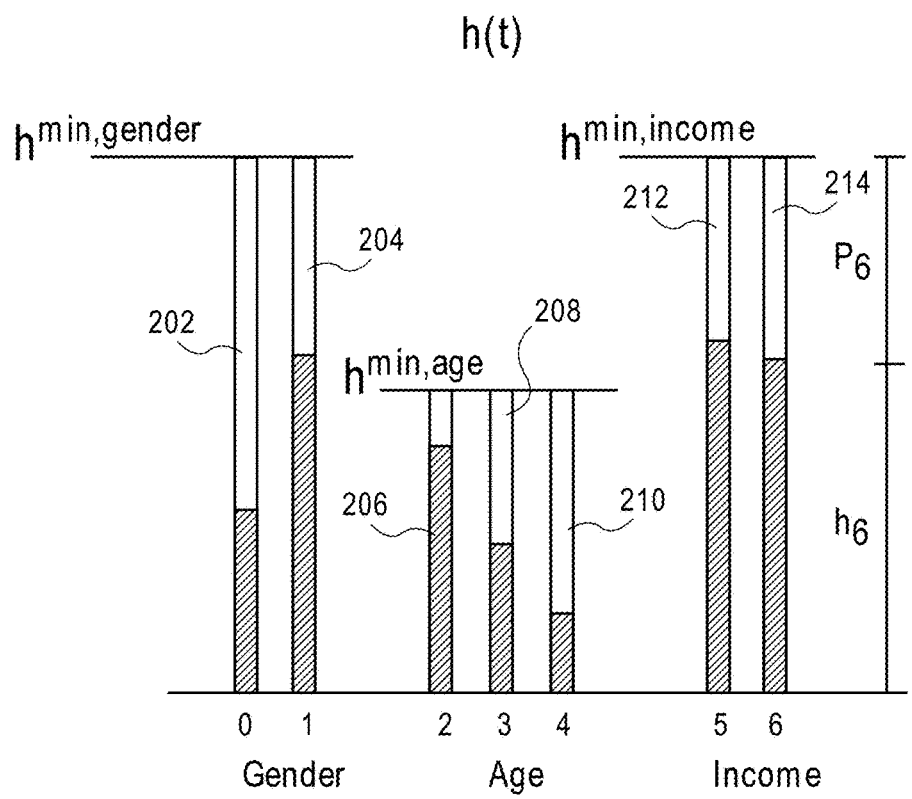

At step 106 the software retrieves from memory on the computing device a representation of a survey histogram, h(t). An example of a histogram 200 is shown in FIG. 2. Each bin 202-214 in the histogram is calculated using equation (2) below. Histogram 200 shows what is referred to as an emptiness of each bin (the non-shaded part). Equation (2) measures the percent emptiness of each bin with respect to the bin's minimum fill level $h_{min}$. In other words, it shows the degree to which the survey needs a new entry matching that entry's profile. A large percentage of emptiness for a bin indicates a strong need for that characteristic. In another embodiment, each bin or some of the bins may be weighted as shown in equation (4) below giving certain bins more emphasis over others. This may be useful in cases where the service provider knows that a particular bin is less probable or rare. In this case, the bin may be given a high weight so that even if several or a string of new entries come in and they all happen to fall into this bin, thereby decreasing the percentage of emptiness for that bin, the system will accept them anyway. Because they are "rare," the system should not reject them even though that bin is filling up at a faster pace than the other bins. In other words, the system will accept them into the survey despite the statistical anomaly of having a spike in the number of comparatively improbable entries come in during a short period. The weighted version takes advantage of this spike to create a balanced survey-histogram in real time.

At step 108, the system takes the dot product between the vector representation notated as h(t), and the new entry vector, v. As described and shown in FIG. 2, each vector v has the same number of entries, in the described embodiment, eight. Note that the result of this dot product is a single number. At step 110 the software on the specialty programmed computer arrives at what is referred to as a similarity value, S. This value, S, is the outcome of the dot product between a new entry vector and a survey histogram. The value S represents essentially how much the new entry v, having a specific profile, is needed to meet the soft goals of the survey. In other words, how much does the system 'like' the entry. In one implementation, S may be a number between 0 and 1 where being closer to 1 indicates a high similarity to the ideal or most needed respondent and closer to 0 means that the survey does not need respondents of this profile that is, the entry is not similar to the ideal respondent (a theoretical least needed candidate). Thus, the single number S is "big or small" relative to what is possible in the histogram at that time (i.e., during the present iteration).

As noted, there is an ideal respondent, one that is most needed in the survey at a given time and a candidate having a profile that is needed the least. In one embodiment both these profiles have a representation in the system. The one most needed is notated as $v_{max}$ and has its corresponding similarity $S_{max}$ and the one least needed is $v_{min}$ with its corresponding similarity $S_{min}$. The service provider may set these values to an initial value based on what it expects will be the hardest and easiest entries to find. In another embodiment, they can set both to 0.

At step 112 the values for these two similarity values self-adjust. This happens in each iteration of the process described in FIG. 1 if the entry is accepted. That is, at each increase in a unit of time, $S_{max}$ and $S_{min}$ are adjusted based on the slightly modified survey histogram assuming the entry was accepted. $S_{max}$ is adjusted to reflect the new ideal entry (see equation (5) below) and $S_{min}$ adjusted to reflect the least needed entry (equation (6)) after an entry has been accepted as a respondent in the survey. If a candidate is rejected, in one embodiment, these values are not adjusted because the survey histogram has not changed.

At step 114 the service provider sets a threshold notated as θ(t) according to the new $S_{max}(t)$ and $S_{min}(t)$ (where we sometimes suppress the explicit time dependence for notational convenience). This threshold is set as shown in equation (7) below. The threshold is a value between $S_{max}$ and $S_{min}$ and is set in the system by adjusting another variable notated as alpha α. Setting this threshold theta by manually adjusting alpha embodies an important decision by the service provider (or the entity using the survey). Essentially, the provider determines how closely it wants the composition or profile of the survey to match its desired survey profile, also referred to as soft goals versus and how quickly it wants the group to be created. This is the trade-off: speed vs. accuracy. By setting theta lower, by dialing alpha down to a lower number, the provider will create a survey group of 500 (a hard goal) that must be met within a certain amount of time, say n hours, having a profile that matches the ideal or most desired profile by say 70%. By setting theta higher, again by manually dialing alpha to a higher number, the time to create the group will take longer, e.g., 140% of n hours, but may have a profile that matches the ideal profile of the group by 90%. In other words, setting threshold theta embodies making a trade-off between speed and accuracy; speed in creating the survey and accuracy in the profile. Threshold theta is a value, between $S_{min}$ and $S_{max}$, that the similarity S(v), equation (3) and (4), of a new entry v must exceed to be accepted (described in steps below) and is adjusted manually by setting alpha. The speed and accuracy/balance with which surveys can be created can be fine-tuned or calibrated by setting alpha higher or lower.

In many cases, the provider or entity using the survey group may simply adjust alpha so that theta is the average between $S_{min}$ and $S_{max}$, with the expectation that the provider will get a survey group having a reasonably good balance in a manageable or acceptable amount of time, and with few overages. In another embodiment, alpha itself can be self-adjusting depending on the provider's knowledge and foresight of statistics of prospective entries.

At step 116, the system checks whether similarity value S for the new entry vector v is greater than theta. As noted, theta can be adjusted by modifying alpha depending on the needs of the service provider or other entity. If S is greater than theta, control goes to step 120 where the entry is accepted and the survey histogram is updated, more specifically, re-balanced. That is, the relevant bins in the histogram are increased by one unit (based on elements in v) and time advances one unit (t goes to t+1).

At step 122 the system checks if the goal, $G_0$, is complete. In the described embodiment, the hard goal is having at least 500 respondents in the survey. Once this goal is reached, the process of creating a balanced survey group in real time (with minimal overages) is complete. If S does not exceed theta, the entry is rejected and the process starts again with step 102 and a new entry is evaluated.

Figure 4:
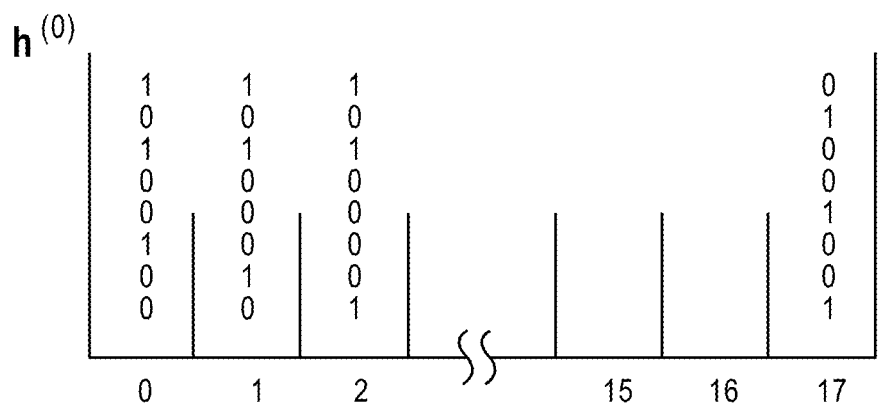

In another embodiment, there are additional goals that are combined and are met for the survey group to be complete. As noted, a first goal, $G_0$, is having at least 500 (or n) respondents in the survey. A histogram for a second goal, G1, has 18 bins, each bin for one occurrence of each possible new entry vector v as described above. An example of this histogram is shown in FIG. 4. As noted in the described embodiment, a vector v has eight elements: two for gender, three for age, and three for income. As such, there are 18 unique entry vectors. A complete histogram listing for each possible entry vector is shown in Table 26 below.

Figure 5:
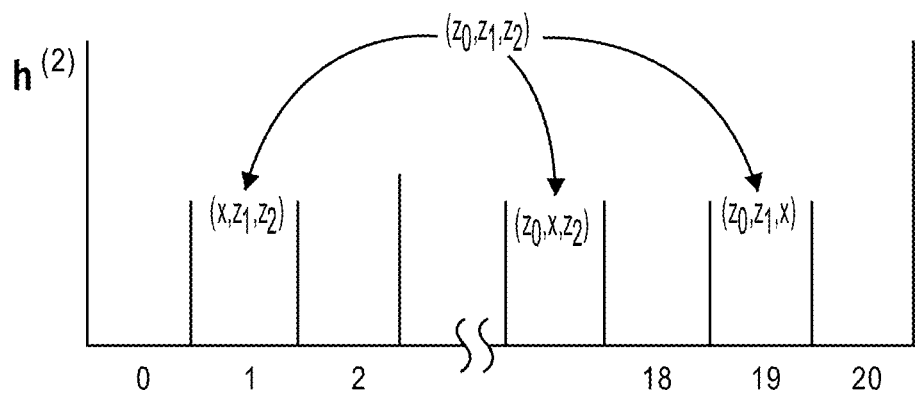

Another goal, $G_2$, is for pairs of bins or pairs with two categories. That is, a similarity value $S_2$ is derived by looking at two bins instead of one, for example, males of lower income, younger females, younger and median income (regardless of gender) and the like. With eight bins there are 21 possibilities. These are shown in the table below. An example of a histogram for G7 is shown in FIG. 5. Each new entry vector v that is examined and accepted may end up in one of three possible bins (or in another embodiment it can go into all three): gender independent (x, $z_1$, $z_2$), age independent ($z_0$, x, $z_2$) or income independent ($z_0$, $z_1$, x). To facilitate this process we rewrite v in a different representation. Instead of the 8 dimensional vector v we represent the same information with a 3 dimensional vector z in which each dimension is a category (gender category, age category and income category) with the following allowed values: gender category is 0 or 1, age category is 0, 1 or 2 and income category is 0, 1 or 2. For example, if v=(1,0,1,0,0,0,0,1) which translates into male, young and rich then z=(male, young, rich)=(0,0,2) or if v=(0,1,0,0,1,1,0,0) then z=(female, old, poor)=(1,2,0). As with $G_0$, the baseline goal described above, each of the bins in the histograms 400 and 500 for goals 1 and 2 has a percent emptiness which is used to determine the similarity values $S_1$ and $S_2$ for each new entry (equations (27) and (29)).

In one embodiment, goals 1, 2, and 3 ($G_0$, $G_1$, and $G_2$) are integrated using a weighted average of their respective goal similarities $S_0$, $S_1$, and $S_2$ using goal integration weights. The weights represent the relative importance of each individual goat. Threshold theta described above may be normalized for similarity values to fall between 0 and 1. In one embodiment, theta (normalized) is equal to alpha. This is shown in equations (31) and (32) below.

Figure 3:
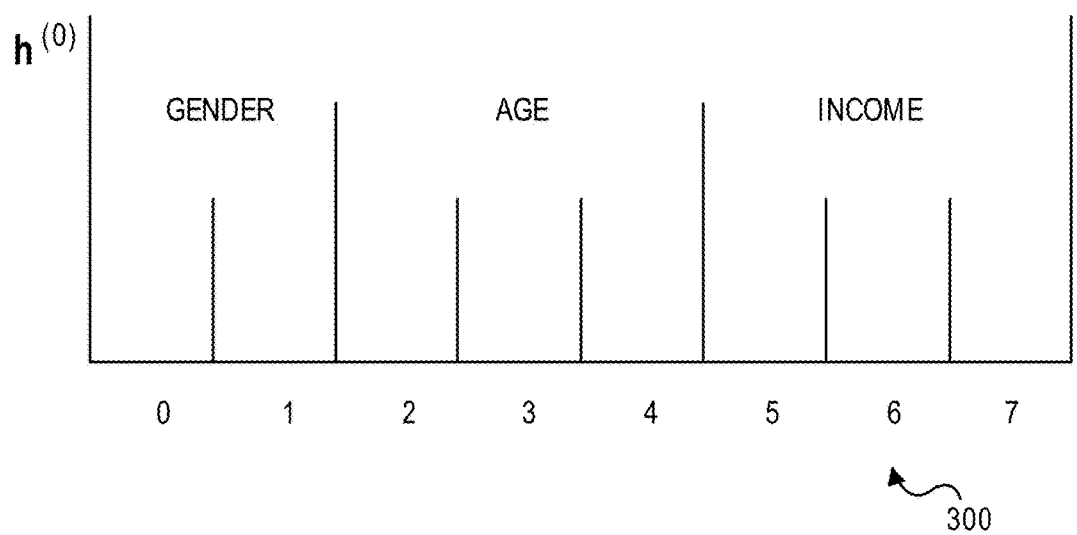

Steps in FIG. 1 can be modified to reflect integration of these goals. In step 106, multiple histogram representations can be retrieved, one for each goal. In the described embodiment, the system would retrieve three histograms for goals one, two, and three. Graphical representations of the histograms are shown in FIGS. 3, 4, and 5 and in the graphs below. Once the vector representations of the histograms are retrieved at step 106, at step 108 the system performs three similarity calculations using equations (25), (27) and (29), yielding $S_0$, $S_1$, and $S_2$ at step 110. These similarity values can be integrated, with their respective goal weights, to produce a single similarity value S equation (30). Note that a new entry may have a low similarity for two of the goals but have a high similarity with respect to the other goal. Depending on the actual goal weights, the entry may be accepted anyway because it helps the system get closer to meeting one of the important goals even though it may not be that helpful for the other goals. If the entry is accepted, then all the histograms are updated at step 120 and at step 122 the system checks if all the goals are complete. If all the goals are complete, the system can exit.

As described above, embodiments of the present invention include methods and systems that automatically manage the processes of accepting new entries when creating a survey group. This is done by sequentially accepting or rejecting a survey taker in real time such that goals are met as closely as possible in an efficient manner with minimum overages. In one embodiment, there is a parameterization such that the company can trade accuracy for speed.

The histogram from which S is derived is modified after every accepted new entry. Also, by using percent-space, the system treats bins not in proportion to their absolute emptiness but to their emptiness percentage. That is, two bins may have very different absolute counts but both may be half empty. For example, bin A has 33 males but needs 66 and bin B has 50 females but needs 100. Both bins are 50% empty. The system would fill the bins at different absolute rates but at equal percent rates such that ideally they both became 100% full at the same time. With all other things being equal, in this simple example the system would take 2 males for every 3 females, on average.

When implementing the present invention, the company may choose how restrictive or strict it wants to be with respect to fulfilling soft goats. As described, a threshold value, theta θ, is adjusted, through another variable alpha α, based on how restrictive the company wants to be with respect to the soft goals. As described, there is a trade-off, for example, between abiding by the soft goals and speed in creating a survey group.

In one embodiment, the company computes how much a new entry v fulfills the needs of the survey as dictated by emptiness vectors comprising a survey histogram. This is done by taking the dot product, as shown in the formulas below, between h(t) and v. This will provide a similarity value, S. The upper bound is $S_{max}$, which represents the best possible survey taker, that is, the survey taker that is needed the most. The lower bound is $S_{min}$, representing the least needed survey taker. As described above, a parameter, alpha α, represents a filter strength that can be adjusted by the service provider. If a is set equal to 1, the highest value, then all survey takers will be rejected (θ is essentially set to $S_{max}$) and there is maximum filtering. If α is tuned to 0, then θ is equal to $S_{min}$, and every survey taker will be accepted. Therefore, the company can tune α to how precise it wants to be in reaching its soft goals, that is, in obtaining a specific demographic profile of its survey group.

As noted, equations (18) and (19) can be used for tuning α. One factor that may be considered in determining α is what types of candidates are expected. Third parties may run simulations and have different statistical distributions of people it expects to find. This statistical distribution or bias can be used to calibrate individual bin weights to factor in low probabilities of occurrence for each bin. As such, bin emptiness percentages are not the sole or overriding factor in determining acceptance criteria. It should be noted that statistical distribution characteristics are not required in advance to set α. However, it is advised that the company be flexible about setting α. That is, it should not expect to get highly accurate distribution of survey takers without some expected overage. If it wants to minimize overage and the cost of each acceptance after a certain point) it should set α accordingly.

With respect to tuning α, random V's are generated, according to a distribution and different α are tried to see which is most efficient. This allows the company to see which α provides the best filtering given a certain sample.

It is helpful to note that the various embodiments are all a function of time given that all values (except α) are re-calculated when a new entry is accepted. This makes θ self-adjusting (θ is a function of time, θ(t)). This results in an elegant and well-functioning design. The dot product between a new entry vector and what entry is ideal is calculated. If S is greater than or equal to θ, then the candidate survey taker is accepted. If it is less, the entry is rejected. As noted, the threshold is self-adjusting. The system maintains precision all through the process to the creation of the survey.

Alpha, α, can be tuned aggressively when the sample distribution is relatively predictable or certain. It should not be when the sample distribution is not known, that is, the service provider is not certain what type of entries to expect. If α is too high, then the company will hit the target sample size (e.g., 500) and it will have an accurate distribution (one closely matching what the company wants), but it will be expensive with overages and extra time. There will be a high rejection rate thereby causing the service provider to charge more for each acceptance.

A modular integration scheme is shown in formula (30). It is useful to note that bin weights can be used to override "fullness." For example, if a survey taker fits a category that is less probably, then accept even if not needed at that time. That is, the bin is relatively full compared to the others. In one embodiment, another threshold, θ, is needed to see how a potential survey taker satisfies all three goals.

Figure 6A:
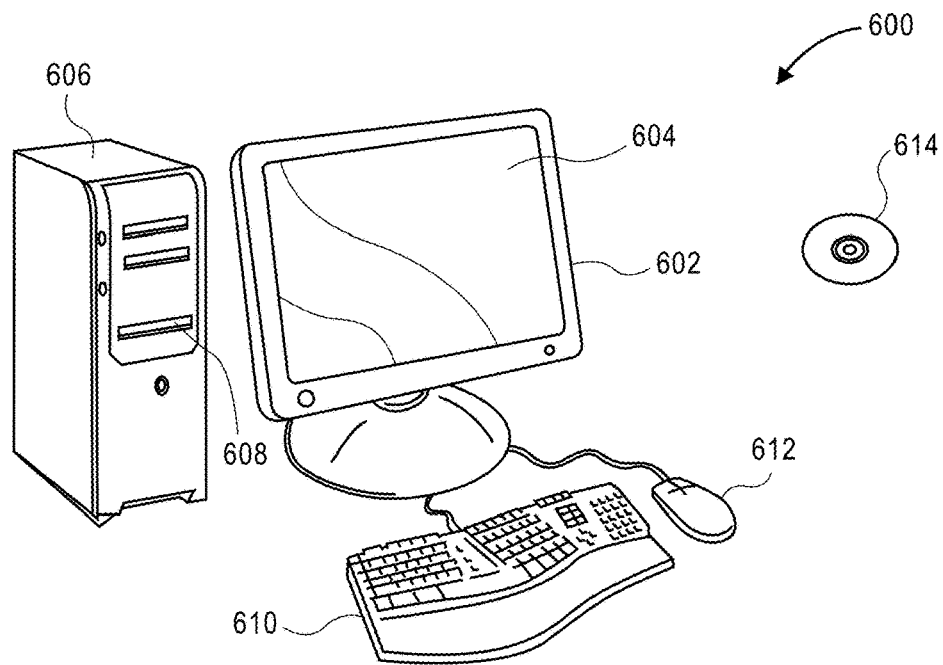
Figure 6B:
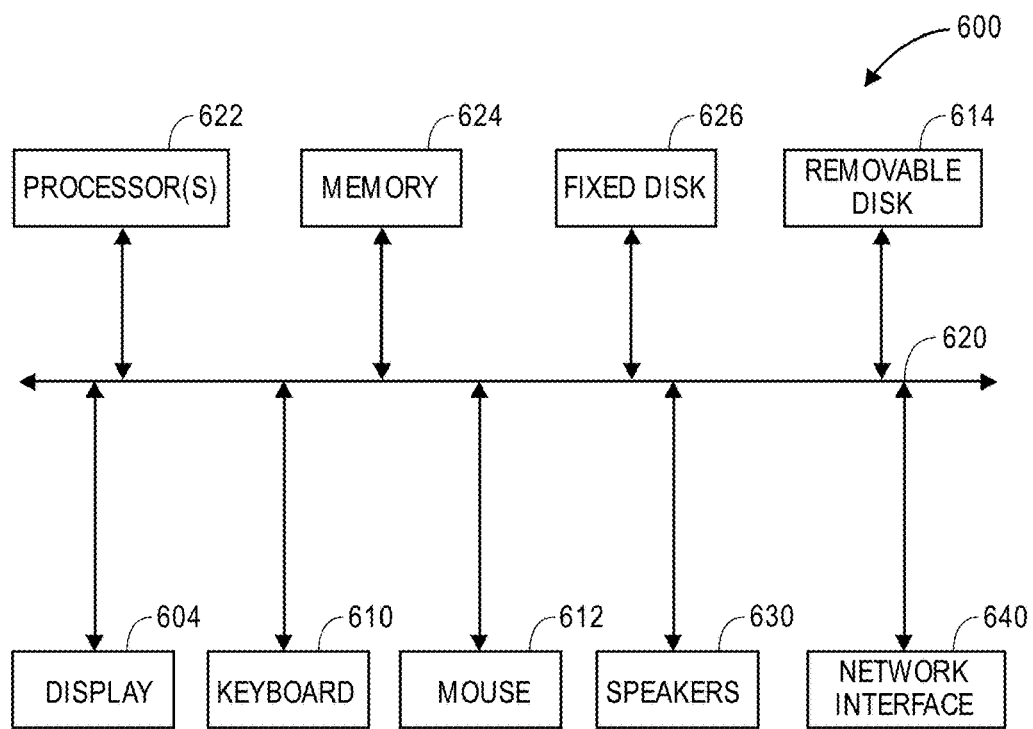

FIGS. 6A and 6B illustrate a computing system 600 suitable for implementing embodiments of the present invention. FIG. 6A shows one possible physical form of the computing system. Of course, the computing system may have many physical forms including an integrated circuit, a printed circuit board, a small handheld device (such as a mobile telephone, handset or PDA), a personal computer or a super computer. Computing system 600 includes a monitor 602, a display 604, a housing 606, a disk drive 608, a keyboard 610 and a mouse 612. Disk 614 is a computer-readable medium used to transfer data to and from computer system 600.

FIG. 6B is an example of a block diagram for computing system 600. Attached to system bus 620 are a wide variety of subsystems. Processor(s) 622 (also referred to as central processing units, or CPUs) are coupled to storage devices including memory 624. Memory 624 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 626 is also coupled bi-directionally to CPU 622; it provides additional data storage capacity and may also include any of the computer-readable media described below. Fixed disk 626 may be used to store programs, data and the like and is typically a secondary storage medium (such as a hard disk) that is slower than primary storage. It will be appreciated that the information retained within fixed disk 626, may, in appropriate cases, be incorporated in standard fashion as virtual memory in memory 624. Removable disk 614 may take the form of any of the computer-readable media described below.

CPU 622 is also coupled to a variety of input/output devices such as display 604, keyboard 610, mouse 612 and speakers 630. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 622 optionally may be coupled to another computer or telecommunications network using network interface 640. With such a network interface, it is contemplated that the CPU might receive information from the network, or might output information to the network in the course of performing the above-described method steps. Furthermore, method embodiments of the present invention may execute solely upon CPU 622 or may execute over a network such as the Internet in conjunction with a remote CPU that shares a portion of the processing.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the embodiments described are to be considered as illustrative and not restrictive, and the invention is not to be limited to the details given herein, but may be modified within the scope and equivalents of the appended claims.

I claim:

1. A method of creating a balanced survey group in real time, the method comprising:
   creating, using a processor of a computing system, a vector representation of an entry, the vector representation being a multidimensional vector representation identifying an exclusion or inclusion of a candidate from each of a plurality of categories;
   calculating, using the processor of the computing system, a similarity value indicating a similarity between the vector representation and a first histogram vector, the first histogram vector representing a dynamically balanced emptiness associated with each of a plurality of categories determined based on a first goal and during a creation of an initial survey group, the similarity value being a result of a dot product between the vector representation and the first histogram vector;
   determining, using the processor of the computing system, whether the similarity value is greater than a similarity threshold by comparing the result of the dot product with the similarity threshold, the similarity threshold being determined based on a linear superposition of a most-preferred entry vector and a least-preferred entry vector representing a type of respondent most needed and least needed; and
   integrating, using the processor of the computing system, the entry vector representation into the first histogram vector, wherein the first histogram relates to the first goal, and wherein the integrating enables, at least in part, dynamic balancing of the first histogram vector while the initial survey group is being created.

2. A method as recited in claim 1 wherein creating a vector representation of an entry further comprises:
   processing entry data, wherein an entry vector has a plurality of elements.

3. A method as recited in claim 1 further comprising:
   deriving a most-preferred entry vector by examining the first histogram.

4. A method as recited in claim 3 further comprising:
   deriving a least-preferred entry vector by examining the first histogram.

5. A method as recited in claim 4 further comprising:
   calculating the similarity threshold by using the most-preferred entry vector and the least-preferred entry vector and a manually-adjusted variable.

6. A method as recited in claim 5 wherein the manually-adjusted variable corresponds to a filter strength used to balance a trade-off between survey histogram balance and time taken to create the survey group.

7. A method as recited in claim 5 wherein adjusting the variable determines the accuracy of a final histogram and the speed at which the final histogram is created.

8. A method as recited in claim 7 further comprising:
   updating the most-preferred entry vector and least-preferred entry vector with each iteration.

9. A method as recited in claim 1 further comprising:
   modifying the first survey histogram based on an integrated entry vector representation.

10. A method as recited in claim 1 wherein an entry vector has eight elements including two for gender, three for income, and three for age.

11. A method as recited in claim 1 further comprising:
    integrating the first goal with a second goal and a third goal, wherein the first goal is having a minimum number of entries in a survey, the second goal is having at least one of each possible entry in the survey, the third goal is having at least one of each possible pairs in the survey.

12. A method as recited in claim 1 further comprising:
    checking if the first goal has been met.

13. A method as recited in claim 1 further comprising:
    rejecting the entry if the similarity value does not exceed the similarity threshold, wherein the first histogram is updated with the entry.

14. A method of creating a balanced survey group in real time with multiple goals, the method comprising:
    creating a vector representation of an entry, the vector representation being a multidimensional vector representation identifying an exclusion or inclusion of a candidate from each of a plurality of categories;
    calculating a first similarity value indicating a similarity between the vector representation and a first histogram vector, the first histogram vector representing a dynamically balanced emptiness associated with each of a plurality of categories determined based on a first goal and during a creation of an initial survey group, the similarity value being a result of a dot product between the vector representation and the first histogram vector;
    calculating a second similarity value indicating a similarity between the vector representation and a second histogram vector;
    calculating a third similarity value indicating a similarity between the vector representation and a third histogram vector;
    integrating the first, second, and third similarity values to calculate a final similarity value; and
    integrating the entry vector representation into the first histogram vector, the second histogram vector, and the third histogram vector based on a comparison of the first similarity value, the second similarity value, and the third similarity value with at least one similarity threshold, wherein the first histogram relates to the first goal, the second histogram relates to a second goal, and the third histogram relates to a third goal, and wherein the integrating enables, at least in part, dynamic balancing of the first histogram vector, the second histogram vector, and the third histogram vector while at least one initial survey group is being created.

15. A method as recited in claim 14 further comprising:
    assigning weights to the first similarity value, the second similarity value, and the third similarity value before calculating the final similarity value.

16. A method as recited in claim 14 further comprising:
    checking if all of the first goal, the second goal, and the third goal are reached.

17. A method as recited in claim 14 further comprising:
deriving a most-preferred entry and a least-preferred entry for the first histogram;
deriving a most-preferred entry and a least-preferred entry for the second histogram; and
deriving a most-preferred entry and a least-preferred entry for the third histogram.

18. A method as recited in claim 14 further comprising:
creating a three-dimensional vector representation of the entry for use with the third similarity value and the third histogram vector.

19. A computing apparatus for creating a balanced survey group in real time, the apparatus comprising:
means for creating a vector representation of an entry, an entry being a potential respondent in a survey, and the vector representation being a multidimensional vector representation identifying an exclusion or inclusion of the potential respondent from each of a plurality of categories;
means for calculating a similarity value indicating a similarity between the entry vector representation and a first histogram vector, the first histogram vector representing a dynamically balanced emptiness associated with each of a plurality of categories determined based on a first goal and during a creation of an initial survey group, the similarity value being a result of a dot product between the vector representation and the first histogram vector;
means for determining whether the similarity value is greater than a similarity threshold by comparing the result of the dot product with the similarity threshold, the similarity threshold being determined based on a linear superposition of a most-preferred entry vector and a least-preferred entry vector representing a type of respondent most needed and least needed; and
integrating the entry vector representation into the first histogram vector in real time, wherein the first histogram relates to the first goal, and wherein the integrating enables, at least in part, dynamic balancing of the first histogram vector while the initial survey group is being created.

* * * * *